(12) United States Patent
Hausberg et al.

(10) Patent No.: US 11,702,195 B2
(45) Date of Patent: *Jul. 18, 2023

(54) SYSTEM FOR REDUCING VIBRATIONS OR STRESSES IN A ROTOR BLADE SYSTEM

(71) Applicant: AIRBUS HELICOPTERS TECHNIK GMBH, Calden (DE)

(72) Inventors: Andre Hausberg, Kassel (DE); Steffen Hartmann, Kassel (DE)

(73) Assignee: AIRBUS HELICOPTERS TECHNIK GMBH, Calden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,607

(22) Filed: Jul. 26, 2021

(65) Prior Publication Data

US 2021/0347471 A1 Nov. 11, 2021

Related U.S. Application Data

(63) Continuation of application No. 15/366,397, filed on Dec. 1, 2016, now Pat. No. 11,091,253.

(30) Foreign Application Priority Data

Dec. 4, 2015 (DE) .......................... 102015224258.7

(51) Int. Cl.
*B64C 27/00* (2006.01)
*B64C 27/605* (2006.01)
(Continued)

(52) U.S. Cl.
CPC ............ *B64C 27/001* (2013.01); *B64C 27/46* (2013.01); *B64C 27/605* (2013.01);
(Continued)

(58) Field of Classification Search
CPC ....... B64C 27/001; B64C 27/54; B64C 27/72; B64C 2027/7272; B64C 2027/7266; B64C 2027/7216
See application file for complete search history.

(56) References Cited

U.S. PATENT DOCUMENTS 4,379,678 A * 4/1983 Carlock .................. B64C 27/54
416/158
4,946,354 A 8/1990 Aubry
(Continued)

FOREIGN PATENT DOCUMENTS

DE         601 01 928 T2    1/2005
DE      10 2008 022 895 A1   11/2009
DE      10 2009 001 393 A1    9/2010

OTHER PUBLICATIONS

German Search Report dated Sep. 26, 2016 for German Patent Application No. 10 2015 224 258.7 (German language with two-page English explanations) (9 pp.).
(Continued)

*Primary Examiner* — Courtney D Heinle
*Assistant Examiner* — Andrew Thanh Bui
(74) *Attorney, Agent, or Firm* — Brooks Kushman P.C.

(57) ABSTRACT

In one aspect, the present disclosure provides a system for reducing vibrations or stresses in a rotor blade system. The system may include at least three rotor blades configured to be rotated about a main rotor axis, where each of the three rotor blades may be adjusted by at least one electrically-adjustable control rod of a plurality of control rods. The plurality of control rods may include a first number of control rods forming a first group, and the plurality of control rods may include a second number of control rods forming a second group. A first circuit for may activate or deactivate the first group of control rods, and a second
(Continued)

circuit may activate or deactivate the second group of control rods.

19 Claims, 6 Drawing Sheets

(51) Int. Cl.
 *B64C 27/46* (2006.01)
 *B64C 27/72* (2006.01)
(52) U.S. Cl.
 CPC .............. *B64C 2027/004* (2013.01); *B64C 2027/7216* (2013.01); *Y02T 50/30* (2013.01)

(56) References Cited

U.S. PATENT DOCUMENTS

| 5,011,373 | A | 4/1991 | Aubry et al. |
| 5,474,424 | A | 12/1995 | Bietenhafer et al. |
| 6,231,005 | B1 | 5/2001 | Costes |
| 6,530,542 | B2 | 3/2003 | Toulmay |
| 7,674,091 | B2 | 3/2010 | Zierten et al. |
| 2002/0187041 | A1 | 12/2002 | Arnold |

OTHER PUBLICATIONS

Arnold, T.P. et al., "Flight Testing of an In-Flight Tuning System on a CH-53G Helicopter," 70th American Helicopter Society International Annual Forum, 2014, Montreal, Quebec, May 20-22, 2014, vol. 3, Red Hook, New York, Curran, 2014, S., pp. 1953-1967 (15 pp. ), ISBN 9781632666918.

Fuerst, D. and Arnold, T.P., "In-Flight Tuning: Wind Tunnel Test Results and Flight Preparation," 67th American Helicopter Society International Annual Forum, 2011, Virginia Beach, Virginia, USA, May 3-5, 2011, vol. 1, Red Hook, New York, Curran, 2011, S., pp. 617-628 (12 pp. ), ISBN 978-1-61782-881-2.

* cited by examiner

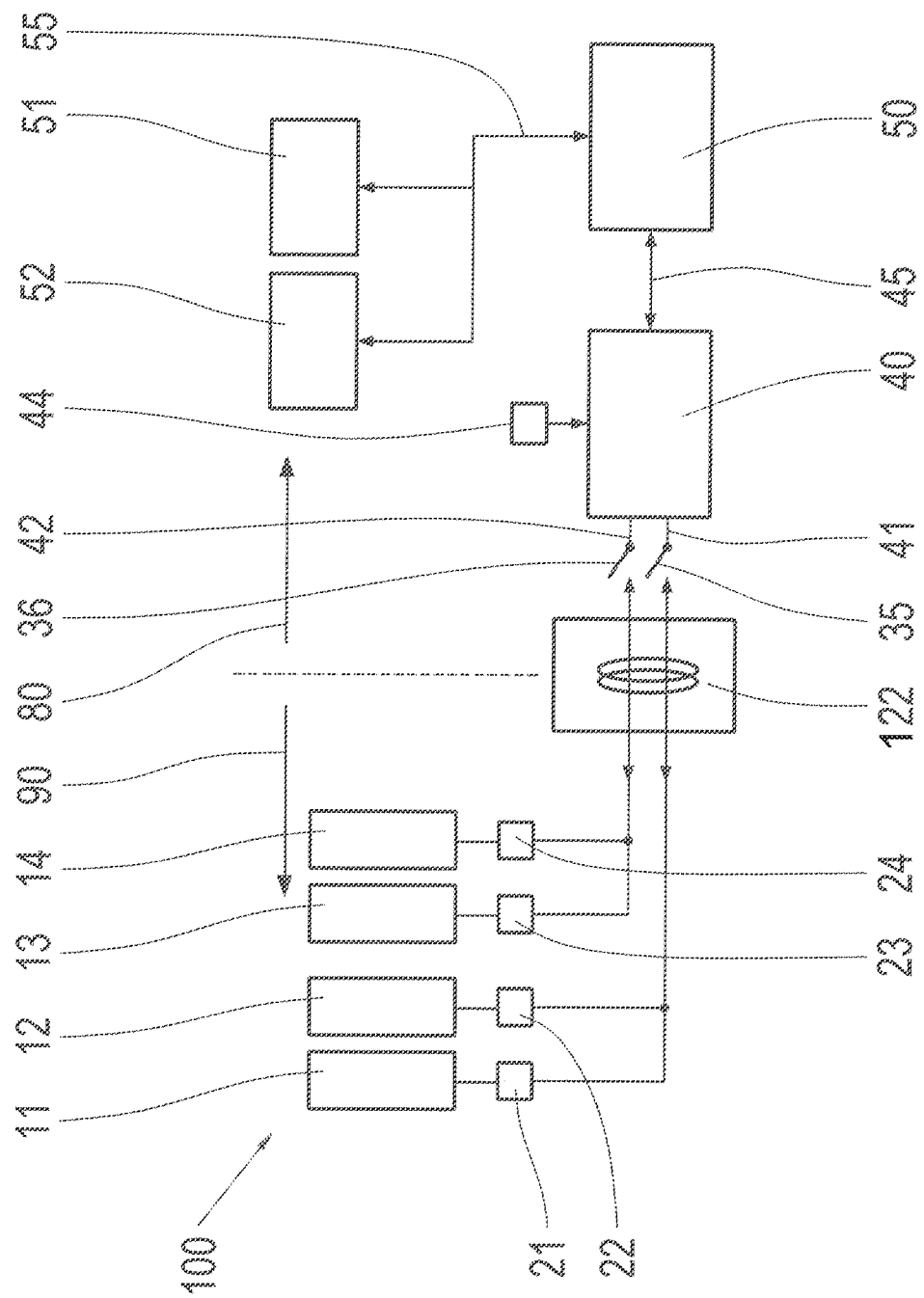

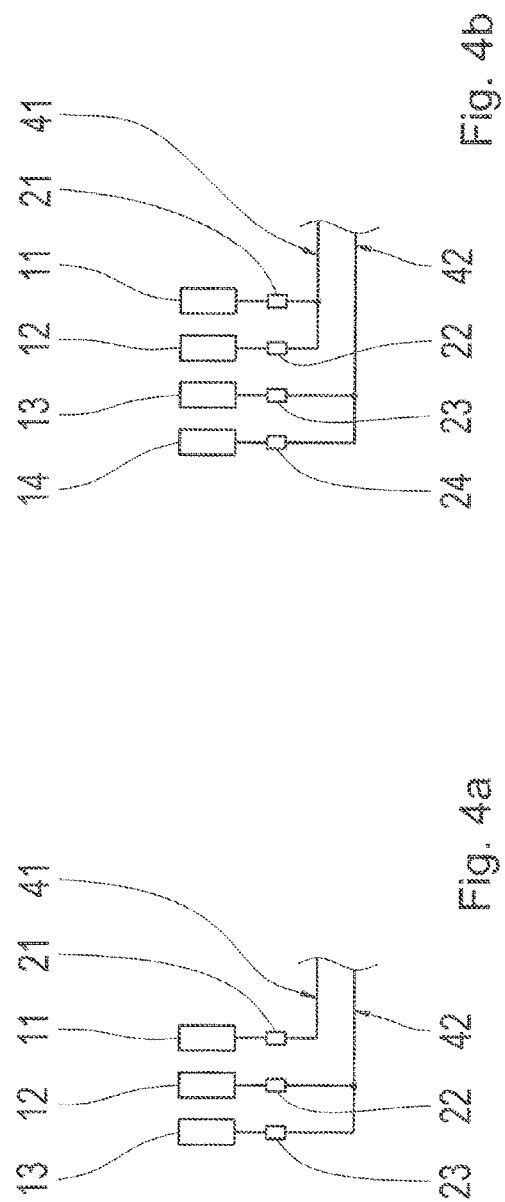
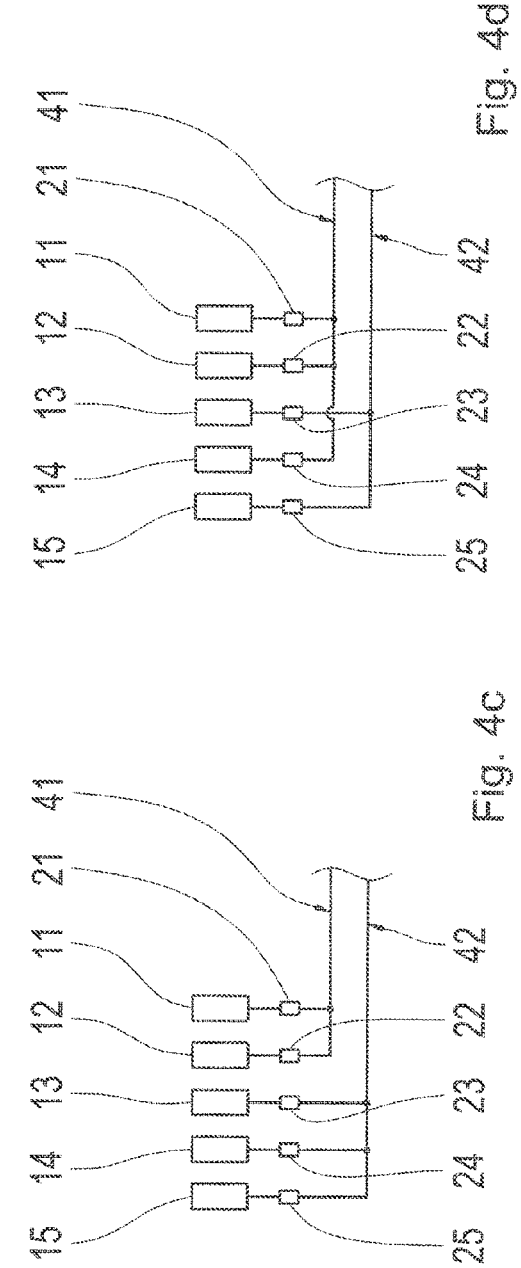

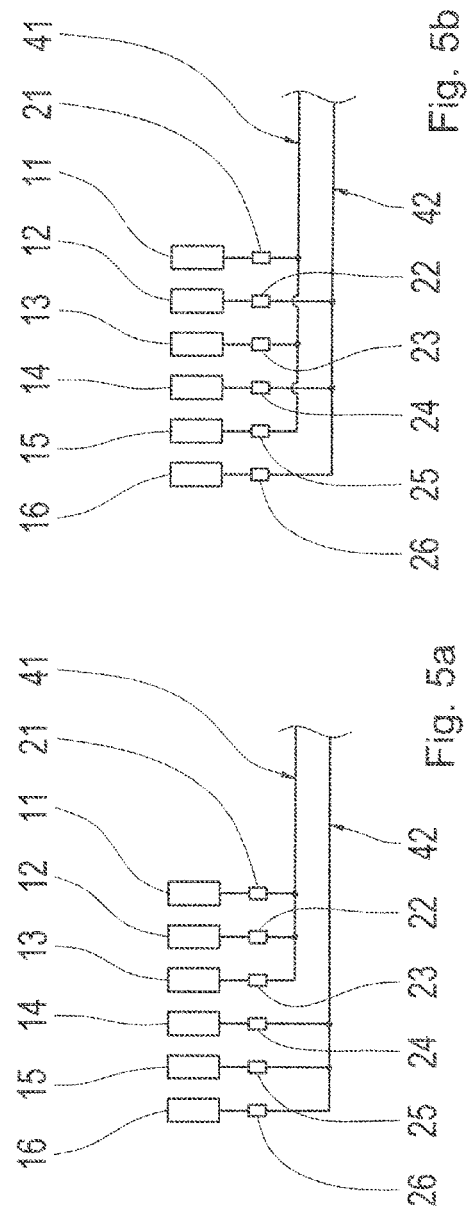
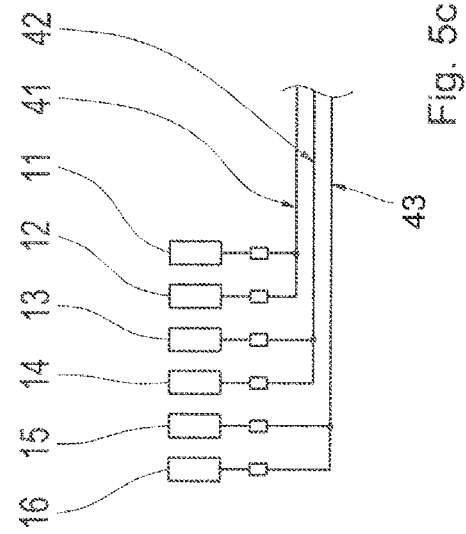

SYSTEM FOR REDUCING VIBRATIONS OR STRESSES IN A ROTOR BLADE SYSTEM

RELATED APPLICATIONS

This application is a continuation of U.S. patent application Ser. No. 15/366,397, entitled "SYSTEM FOR REDUCING VIBRATIONS OR STRESSES IN A ROTOR BLADE SYSTEM," filed on Dec. 1, 2016, which claims the benefit of priority from German patent application DE 10 2015 224 258.7, filed Dec. 4, 2015. Each application listed in this paragraph is hereby incorporated by reference in its entirety.

BACKGROUND

The present disclosure relates to a system for reducing vibrations or stresses in a rotor blade system, which may comprise at least three rotor blades, which can be rotated about an axis, and which can be respectively electrically adjusted by means of a control rod that can be electrically adjusted in longitudinal direction.

It is known to affect and thus reduce the level of vibration in a helicopter by means of in-flight tuning (IFT), depending on the flight condition. Vibrations affect the structural integrity of the helicopter, reduce the lifetime of various components, adversely affect the function of several instruments and increase the physical and psychological stress of crew and passengers. Depending on the vibration amplitude, the effects of the 1/rev and n/rev vibrations caused by the main rotor can range from minor comfort losses all the way to disastrous mistakes. It is characteristic for the IFT to represent the connection between the rotating part of the swashplate and rotor blade linkage by means of a linear actuator, for example, a smart pitch rod (SPR). By means of such an actuator, each rotor blade can be controlled individually, and additionally for adjustments through the swashplate, with small displacement. The adjustment takes place automatically based on permanently recorded and processed vibration signals which are evaluated by means of a computer and respective calculations supply an optimum adjustment of the SPR as an output value, as has been disclosed, for example, in two articles by Uwe Arnold et al., "In-Flight Tuning: Wind Tunnel Test Results and Flight Test Preparation", 67. American Helicopter Society, Virginia Beach, May 3-5, 2011, and "Flight Testing of an In-Flight Tuning System on a CH-53G Helicopter", 70. American Helicopter Society, Montreal, May 20-22, 2014.

It is also known to classify risk or danger potentials. For example, it is possible that errors exist in the control or regulation of the length adjustment of a control rod. The adjustable length (which is referred to as the authority), is proportional to the possible change of the vibration amplitude (Delta-Vibrations). At the same time, the classification depends on the total authority of the rotor blade system with multiple, electrically length-adjustable control rods. To implement software and electronic hardware for length adjustment of the control rods as simple and cost-effective as possible, it is required that potential failures present a small risk and danger potential. However, this goal conflicts with the requirement for the largest possible total authority, to reduce the vibrations over the greatest possible operating range.

BRIEF DESCRIPTION OF THE DRAWINGS

The figures, figure description and the claims include multiple characteristics in combination. Practically, an expert would also consider the characteristics on an individual basis and combine them to expedient further combinations.

FIG. 3 shows a schematic view of a first preferred.

FIG. 4a-4d show further preferred embodiments with three, four and five rotor blades.

FIG. 5a-5c show additional preferred embodiments with 6 rotor blades.

DETAILED DESCRIPTION

Figure 1:
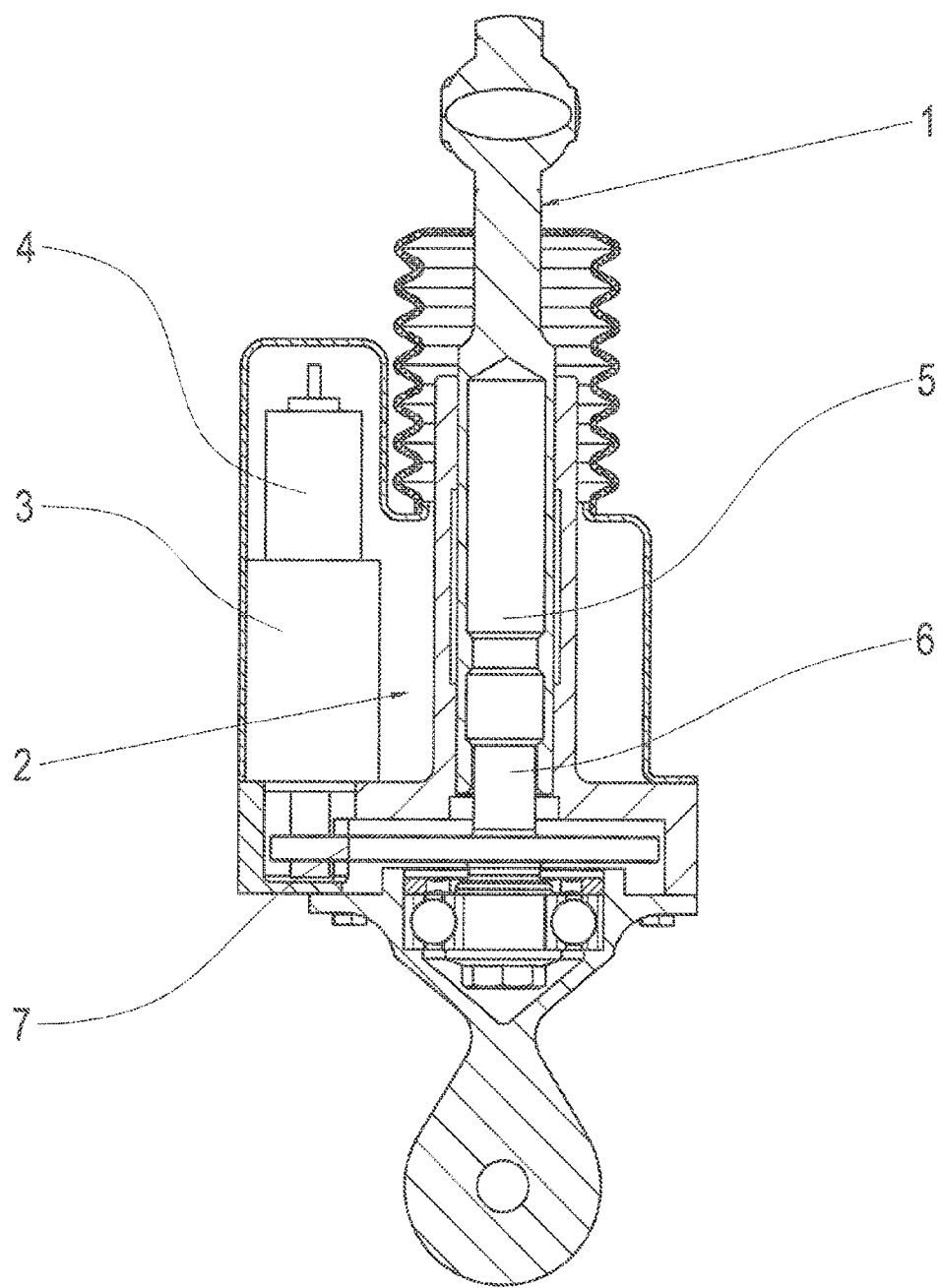
FIG. 1 shows a control rod according to prior art.

It is an objective of the embodiments of the present disclosure to provide an improved and more cost-effective system for reducing vibrations or stresses in a rotor blade system. In particular, it is the objective of the present invention to provide a system for reducing vibrations or stresses in a rotor blade system that can be controlled or regulated by means of cost-effective software or electronic hardware.

This problem may be solved by a first number of control rods that forms a first group of control rods, and by a second number of control rods that forms a second group of control rods, where at least one first circuit is provided for activating or deactivating the first group of control rods, and where at least one second circuit is provided for activating or deactivating the second group of control rods.

The electrically adjustable control rods arranged in the rotating system of the helicopter can be supplied with voltage via at least two switchable circuits from a voltage source arranged in the compartment of the helicopter, the non-rotating system of the helicopter.

The at least three rotor blades may be equally distributed about the rotor axis. The control rods each may comprise an adjusting mechanism with a self-locking capacity, which has a self-locking effect when the electrical length adjustment is inactive. However, the control rods can also be provided with a brake or lock, which prevents or blocks the length adjustment when no electrical voltage is applied.

The present embodiments may allow for a large total authority of the system while, at the same time, providing low requirements on the safety level of a software and hardware for length adjustment of the control rods.

The total authority describes the entire length adjustment of the electrically adjustable control rods. The larger the total authority of the system the lower the effect on occurring errors, for example, an error in the control or regulation of the control rod adjustment.

The low requirements can be implemented in that the control rods are combined in groups and each group is supplied by a separately switchable circuit.

A group of control rods can involve multiple control rods or a single control rod. For example, a three-blade rotor comprises two groups of control rods, wherein a first group has two control rods and a second group of control rods has one single control rod. The term "number of control rods" is to be understood in that sense.

In a first preferred embodiment, it is provided that an even number of rotor blades is supplied and that the group-wise assignment of the control rods takes place in such a way that opposite control rods are not assigned to the same group. Opposite means that two rotor blades located in a rotor blade plane span an angle of 180°. This allows for an even more optimized reduction of vibrations, because it can be eliminated that control rods arranged on the same action line neutralize each other.

Furthermore, it is preferred that an even number of rotor blades is provided and that the control rods assigned to the first group and the control rods assigned to the second group are respectively arranged consecutively in peripheral direction of the axis.

It is preferred that an even number of rotor blades is provided and that control rods which are adjacent in peripheral direction are assigned to different groups.

Furthermore, it is preferred that the two circuits can be switched independently from one another. For example, this can be performed manually.

It is preferred that a third number of control rods forms a third group of control rods and a third circuit is provided for activating and deactivating the third group.

FIG. 1 shows an electrically adjustable control rod (SPR) 1 according to prior art. The electrically adjustable control rod 1 for adjusting a rotor blade of a helicopter comprises a bearing housing on the end situated on the side of the rotor blade and a bearing housing on the end situated on the side of the engine. In longitudinal direction, the control rod 1 is designed in such a way that it can be adjusted within a predetermined setting range. To make adjustments, the control rod 1 comprises at least one actuator 2 which has a spindle drive powered via a planetary gear 3 by an electric motor 4. The spindle drive comprises a spindle nut 5 which is moved axially by a spindle 6. The spindle 6 is driven by means of a gear or spur gear stage 7, which is powered via the planetary gear 3 by the electric motor 4.

Figure 2B:
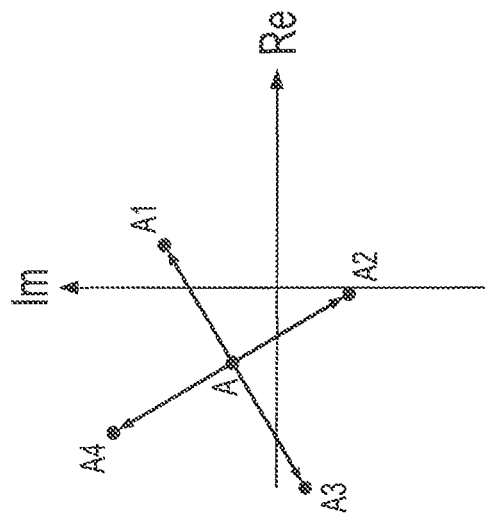
FIG. 2a-2d show displacement(s) of helicopter vibrations by adjusting one or multiple SPRs.
Figure 2A:
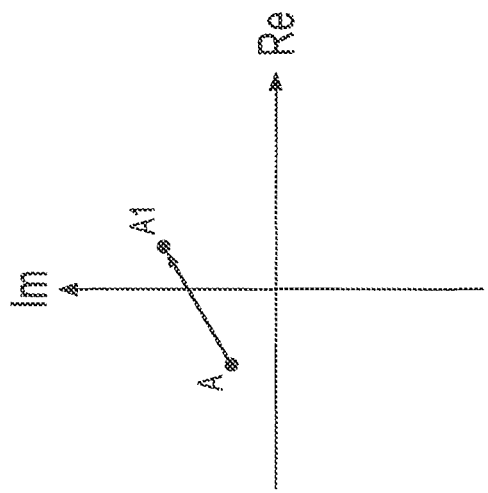

By means of FIG. 2a-2d, the term of authority is described in more detail: the mechanical length variation of an SPR results in a displacement of helicopter vibrations from A in a complex plane to A1, as shown in FIG. 2a. At the same time, the adjustable length of an individual SPR is proportional to the potential change of the vibration amplitude and is therefore a measure of authority. Consequently, the length of the displacement of the vibrations is dependent on the mechanical adjustment travel of an SPR. The direction of displacement depends on the rotor blade to which the SPR is mounted.

In FIG. 2b, this is demonstrated by means of a four blade rotor. Referring to FIG. 2b and FIG. 3, the adjustment of a first SPR 21 on a first main rotor blade 11 displaces the vibrations from A to A1. The adjustment of a second SPR 22 on a second main rotor blade 12 displaces the vibrations from A to A2. The adjustment of a third SPR 23 on a third main rotor blade 13 displaces the vibrations from A to A3. The adjustment of a fourth SPR 24 on a fourth main rotor blade 14 displaces the vibrations from A to A4. The angle between the resulting displacement vectors in the complex plane amounts to 90°, respectively.

Figure 2C:
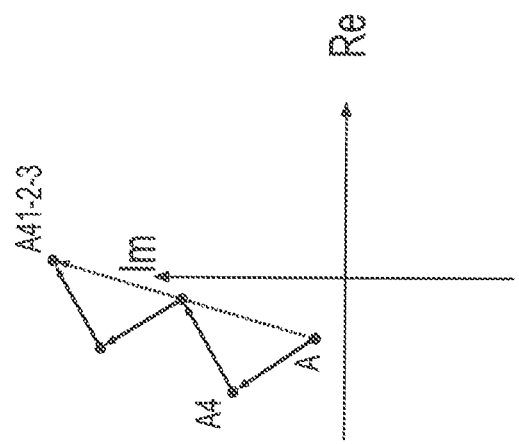

FIG. 2c shows a simultaneous adjustment of two SPRs, which are not located on one working axis, i.e., which are not situated opposite from one another. In such an adjustment, the individual displacements are added vectorially, i.e., an adjustment plane is spanned. By adjusting only two SPRs, all points on the adjustment plane can be reached. The result of the vectorial addition produces the total authority. FIG. 2c shows in an exemplary manner the resulting displacement of the vibrations from A to A41 when adjusting SPR 21 and SPR 24.

Figure 2D:
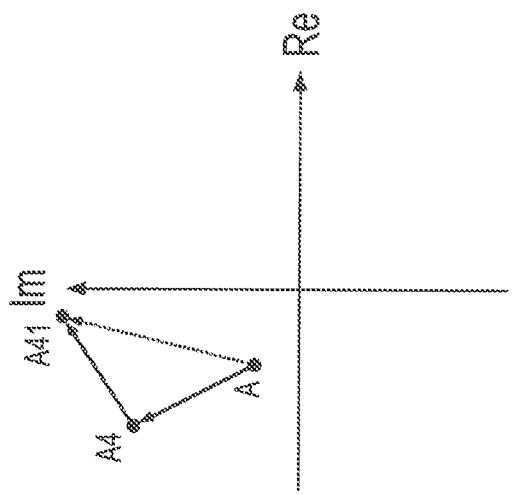

By using the remaining SPRs on the two remaining rotor blades, it is possible to further increase the total authority of the system. FIG. 2d shows the resulting displacement of the vibrations from A to A41-2-3 by adjusting the length of SPR 21 and 24 in positive direction and adjusting SPR 22 and 23 in negative direction.

FIG. 3 shows a schematic sketch of an in-flight tuning system 100 for a helicopter main rotor system with four rotor blades evenly arranged about a main rotor axis.

In a non-rotating system 80 of a helicopter, sensors 52 are provided for recording 1/rev vibrations, as well as sensors 51 for recording further vibrations. The sensors 51, 52 transmit the recorded signals 55 to a computer 50. The computer 50 evaluates the transmitted signals 55 and, based on this evaluation, transmits control signals 45 to a distributor 40. The distributor 40 comprises customary elements (not shown), such as safety elements and switching elements for distributing electrical power and uses 28 Volt DC 44, which is generated by means of a generator (not shown).

In a rotating system 90 of the helicopter (which is separated from the non-rotating system 80 via a swashplate 122), four rotor blades 11, 12, 13 and 14 with their respective SPRs 21, 22, 23 and 24 are arranged. SPR 21 is able to adjust rotor blade 11, SPR 22 rotor blade 12, SPR 23 rotor blade 13 and SPR 24 rotor blade 14. By means of a first switch 35, SPR 21 and 22 of rotor blades 11 or 12 can be connected via a first circuit 41 with the distributor 40. By means of a second switch 36, SPR 23 and 24 of rotor blades 13 or 14 can be connected via a second circuit 42 with the distributor 40. By means of a slip ring, the electrical performance and signal transmission takes place from the non-rotating system 80 to the rotating system 90 and vice versa. Switches 35 and 36 can be optionally closed or opened. In the present embodiment, for example, they can be manually switched by a pilot. FIG. 3 shows both switches 35, 36 in opened condition, i.e., SPR 21 to SPR 24 are disconnected.

FIGS. 4a to 5c show preferred embodiments of helicopter main rotor systems, wherein the figures show merely a section of the rotating system 90.

FIG. 4 shows a preferred embodiment for a helicopter main rotor system with three rotor blades 11, 12 and 13 evenly arranged about a main rotor axis. Rotor blade 11 can be adjusted by means of an SPR 21, wherein SPR 21 is assigned to a first circuit 41. Rotor blades 12, 13 can be adjusted by means of SPR 22 or 23, wherein SPR 22 and 23 are assigned to a second circuit 42. The first circuit can be switched with a first switch 35 (not shown), and the second circuit 42 can be switched with a second switch 36 (not shown). In this embodiment, SPR 21 forms a first group of control rods. SPR 22, 23 form a second group of control rods.

FIG. 4b shows the preferred embodiment depicted in FIG. 3.

SPR 21, 22 of rotor blades 11, 12 form a first group of control rods, and SPR 23, 24 of rotor blades 13, 14 form a second group of control rods. Rotor blade 11 can be adjusted by means of SPR 21, rotor blade 12 by means of SPR 22, rotor blade 13 by means of SPR 23, and rotor blade 14 by means of SPR 24. The first group of control rods is assigned to a first circuit 41, and the second group of control rods is assigned to a second circuit. The first circuit can be switched by means of a first switch 35 (not shown), and the second circuit 42 can be switched by means of a second switch 36 (not shown). In a rotor system with four rotor blades it is mandatory that only those SPRs are assigned to the same group that are adjacent in peripheral direction of the main rotor axis, so that rotor blades assigned to the same group are not located opposite of one another. This also means that in a four blade rotor, always two SPRs have to be assigned to one respectively group.

FIG. 4c shows a preferred embodiment for a helicopter main rotor system with five rotor blades 11, 12, 13, 14 and 15 evenly arranged about the main rotor axis. SPR 21, 22 of rotor blades 11, 12 form a first group of control rods, and SPR 23, 24, 25 of rotor blades 13, 14 and 15 form a second group of control rods. Rotor blade 11 can be adjusted by means of SPR 21, rotor blade 12 by means of SPR 22, rotor blade 13 by means of SPR 23, rotor blade 14 by means of SPR 24, and rotor blade 15 by means of SPR 25. The first group of control rods is assigned to a first circuit 41, and the second group of control rods is assigned to a second circuit. The first circuit can be switched with a first switch 35 (not shown), and the second circuit 42 can be switched with a second switch 36 (not shown). Consequently, in FIG. 4c, in a peripheral direction with respect to the main rotor axis, two consecutive SPRs 21, 22 form the first group, and three consecutive SPRs 23, 24 and 25 in peripheral direction form the second group of control rods. Naturally, any 2:3 combinations are possible.

FIG. 4d shows a further preferred embodiment for a helicopter main rotor system with five rotor blades 11, 12, 13, 14 and 15 evenly arranged about a main rotor axis. SPR 21, 22 and 24 of rotor blades 11, 12, and 14 form a first group of control rods, and SPR 23 and 25 of rotor blades 13 and 15 form a second group of control rods. The first group of control rods is assigned to a first circuit 41, and the second group of control rods is assigned to a second circuit 42. The first circuit can be switched with a first switch 35 (not shown), and the second circuit 42 can be switched with a second switch 36 (not shown). Contrary to FIG. 4c, the SPR group members in peripheral direction are not arranged consecutively in the respective group.

In a rotor system with five rotor blades, it is also possible to assign only a single rotor blade or a single SPR to a group of control rods, and to assign the remaining four SPRs to the other group of control rods. It is also possible to assign the five SPRs to three groups of control rods and to assign each group to one circuit, respectively. For example, SPR 21 could be assigned to one group and a first circuit 41, SPR 22, 23 to a second group and a second circuit 42 and SPR 24, 25 to a third group and a third circuit 43. Also in this case, any 1:2:2 combinations are possible.

FIG. 5a shows a preferred embodiment for a helicopter main rotor system with six rotor blades 11, 12, 13, 14, 15 and 16 evenly arranged a main rotor axis. SPRs 21, 22, 23 form a first group and are assigned to a first circuit 41. SPRs 24, 25, 26 form a second group and are assigned to a second circuit 42. The first circuit can be switched with a first switch 35 (not shown), and the second circuit 42 can be switched with a second switch 36 (not shown).

FIG. 5b shows a further preferred embodiment for a helicopter main rotor system with six rotor blades 11, 12, 13, 14, 15 and 16 evenly arranged about a main rotor axis. SPRs 21, 23, 25 form a first group of control rods and are assigned to a first circuit 41. SPRs 22, 24, 26 form a second group of control rods and are assigned to a second circuit 42. Consequently, in FIG. 5b, an SPR is always neighboring an SPR of the other group.

FIG. 5c shows a further preferred embodiment for a helicopter main rotor system with six rotor blades 11, 12, 13, 14, 15 and 16 evenly arranged about a main rotor axis. Here, two SPRs, respectively, form a group of control rods, forming three groups with two control rods for each group, wherein the three groups are assigned to one circuit 41, 42, 43, respectively. SPR 21 and 22 form the first group and are assigned to the first circuit 41. SPR 23 and 24 form the second group and are assigned to the second circuit 42. SPR 25 and 26 form the third group and are assigned to the third circuit 43. Circuit 41 can be switched manually by means of a first switch 35 (not shown). Circuit 42 can be switched manually by means of a second switch 36 (not shown). Circuit 43 can be switched manually by means of a third switch 37 (not shown).

Even in a rotor with six blades, there are multiple possibilities for group assignments. For example, it is also possible to assign one SPR to a first group, two SPRs to a second group, and three SPRs to a third group.

We claim:

1. A rotor blade system, comprising:
    a first rotor blade, a second rotor blade, and a third rotor blade each rotatable about a rotor axis;
    a plurality of electrically-adjustable control rods;
    wherein each of the first rotor blade, the second rotor blade, and the third rotor blade is adjustable by at least one control rod of the plurality of control rods, wherein the plurality of control rods includes a first number of control rods forming a first group and a second number of control rods forming a second group;
    a first circuit configured for activating and deactivating the first group of control rods;
    a second circuit configured for activating and deactivating the second group of control rods;
    wherein the first group of control rods is adjusted with the first circuit during rotation of the at least three rotor blades when the second group of control rods remains static during normal operation of the rotor blade system; and
    wherein the second group of control rods is adjusted with the second circuit during rotation of the at least three rotor blades when the first group of control rods remains static during normal operation of the rotor blade system.

2. The rotor blade system of claim 1, wherein the rotor blade system includes a fourth rotor blade, wherein the first rotor blade and the third rotor blade are situated opposite one another, wherein the second rotor blade and the fourth rotor blade are situated opposite one another, wherein the first and second rotor blades are assigned to the first group, and wherein the third and fourth rotor blades are assigned to the second group.

3. The rotor blade system of claim 1, wherein the control rods assigned to the first group are arranged consecutively in a peripheral direction of the axis.

4. The rotor blade system of claim 3, wherein the control rods assigned to the second group are arranged consecutively in the peripheral direction of the axis.

5. The rotor blade system of claim 1, wherein the rotor blade system includes an even number of rotor blades, and wherein each control rod is assigned to a different group with respect to the control rods arranged consecutively in a peripheral direction.

6. A system for reducing vibrations or stresses in a rotor blade assembly, the system comprising:
    a plurality of electrically-adjustable control rods;
    at least three rotor blades configured to be rotated about a rotor axis, wherein each of the three rotor blades is configured to be adjusted by at least one control rod of the plurality of control rods;
    the plurality of control rods including a first number of control rods forming a first group and a second number of control rods forming a second group; and
    a first circuit for activating or deactivating the first group of control rods, wherein the first group of control rods is adjusted with the first circuit during rotation of the at least three rotor blades when the second group of control rods remains static during normal operation of the rotor blade assembly, and a second circuit for activating or deactivating the second group of control rods, wherein the second group of control rods is adjusted with the second circuit during rotation of the at least three rotor blades when the first group of control rods remains static during normal operation of the rotor blade assembly.

7. The system of claim 6, wherein the system includes an even number of rotor blades, and wherein rotor blades situated opposite one-another are assigned to different groups.

8. The system of claim 6, wherein the system includes an even number of rotor blades, and wherein the control rods assigned to the first group arranged consecutively in peripheral direction of the axis.

9. The system of claim 8, wherein the control rods assigned to the second group are arranged consecutively in a peripheral direction of the axis.

10. The system of claim 6, wherein the system includes an even number of rotor blades, and wherein each control rod is assigned to a different group with respect to the control rods arranged consecutively in a peripheral direction.

11. The system of claim 10, wherein the first circuit and the second circuit are configured to be controlled independently from one another.

12. The system of claim 6, wherein the plurality of control rods includes a third number of control rods forming a third group, and wherein the system further comprises a third circuit for activating or deactivating the third group of control rods.

13. A system for reducing vibrations or stresses in a rotor blade assembly having at least three rotor blades configured to be rotated about a rotor axis, the system comprising:
 a plurality of control rods configured to adjust when activated to adjust the at least three rotor blades, the plurality of control rods including a first number of control rods forming a first group and a second number of control rods forming a second group; and
 a first circuit for activating or deactivating the first group of control rods, wherein the first group of control rods is adjusted with the first circuit during rotation of the at least three rotor blades when the second group of control rods remains static during normal operation of the rotor blade assembly, and a second circuit for activating or deactivating the second group of control rods, wherein the second group of control rods is adjusted with the second circuit during rotation of the at least three rotor blades when the first group of control rods remains static during normal operation of the rotor blade assembly.

14. The system of claim 13, wherein the at least three rotor blades includes a first rotor blade, a second rotor blade, a third rotor blade, and a fourth rotor blade, wherein the control rods of the first group are configured to adjust the first rotor blade and the second rotor blade, wherein the control rods of the second group are configured to adjust the third rotor blade and the fourth rotor blade, wherein the first rotor blade and the third rotor blade are situated opposite one another, and wherein the second rotor blade and the fourth rotor blade are situated opposite one another.

15. The system of claim 13, wherein the control rods assigned to the first group arranged consecutively in peripheral direction of the axis.

16. The system of claim 15, wherein the control rods assigned to the second group are arranged consecutively in a peripheral direction of the axis.

17. The system of claim 13, wherein each control rod is assigned to a different group with respect to the control rods arranged consecutively in a peripheral direction.

18. The system of claim 13, wherein the first circuit and the second circuit are configured to be controlled independently from one another.

19. The system of claim 13, wherein the plurality of control rods includes a third number of control rods forming a third group, the system further comprising a third circuit for activating or deactivating the third group of control rods.

* * * * *